US007427152B2

(12) United States Patent
Erion et al.

(10) Patent No.: US 7,427,152 B2
(45) Date of Patent: Sep. 23, 2008

(54) HEADLAMP ASSEMBLY WITH INTEGRATED HOUSING AND HEAT SINK

(75) Inventors: Jeffrey Allen Erion, Plymouth, MI (US); Andrew Zachary Glovatsky, Plymouth, MI (US); Myron Lemecha, Dearborn, MI (US); Prathap Amervai Reddy, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 82 days.

(21) Appl. No.: 11/293,913

(22) Filed: Dec. 5, 2005

(65) Prior Publication Data

US 2007/0127257 A1 Jun. 7, 2007

(51) Int. Cl.
*B60Q 1/00* (2006.01)

(52) U.S. Cl. ....................... 362/547; 362/526; 362/373; 362/545

(58) Field of Classification Search ................. 362/547, 362/526, 294, 373
See application file for complete search history.

(56) References Cited

U.S. PATENT DOCUMENTS 1,681,153 A 8/1928 Johnston
3,309,565 A 3/1967 Clark et al.
3,539,799 A 11/1970 Dangauthier
3,639,751 A 2/1972 Pichel
4,085,248 A 4/1978 Zehender et al.
4,168,522 A 9/1979 Van de Laarschot et al.
4,598,347 A 7/1986 Peppers
4,724,515 A 2/1988 Matsuki et al.
4,729,076 A 3/1988 Massami et al.
4,780,799 A 10/1988 Groh
4,931,912 A 6/1990 Kawakami et al.
4,937,710 A 6/1990 Hurley et al.
4,978,890 A 12/1990 Sekiguchi et al.
5,172,973 A 12/1992 Spada
5,251,111 A * 10/1993 Nagengast et al. .......... 362/547
5,406,467 A 4/1995 Hashemi
5,458,505 A 10/1995 Prager
5,758,955 A 6/1998 Belliveau
5,857,767 A 1/1999 Hochstein (Continued)

FOREIGN PATENT DOCUMENTS

FR 2 701 756 2/1993

(Continued)

OTHER PUBLICATIONS

English Abstract of French Publication No. FR 2 698 055 A1.

(Continued)

*Primary Examiner*—Ali Alavi
*Assistant Examiner*—Evan Dzierzynski
(74) *Attorney, Agent, or Firm*—Brinks Hofer Gilson & Lione

(57) ABSTRACT

A headlamp assembly for a motor vehicle having a light source, a chamber that receives the light source and a cooling channel for removing heat from the chamber. A conductive wall and an insulating wall cooperate to define the chamber and the channel. The conductive wall has a substantially higher thermal conductivity than the insulating wall to promote the heat exchange between the chamber and the cooling channel and to reduce heat exchange between the cooling channel and the relatively hot engine compartment.

18 Claims, 3 Drawing Sheets

U.S. PATENT DOCUMENTS

| | | | | |
|---|---|---|---|---|
| 5,947,592 | A | 9/1999 | Barlow | |
| 6,021,954 | A | 2/2000 | Kalwa et al. | |
| 6,045,248 | A | 4/2000 | Ashizawa | |
| 6,071,000 | A | 6/2000 | Rapp | |
| 6,183,114 | B1 | 2/2001 | Cook et al. | |
| 6,210,024 | B1 | 4/2001 | Shida | |
| 6,224,247 | B1 | 5/2001 | Ashizawa | |
| 6,367,949 | B1 | 4/2002 | Pederson | |
| 6,402,346 | B1 * | 6/2002 | Liao et al. | 362/294 |
| 6,419,382 | B1 | 7/2002 | Nakagawa et al. | |
| 6,497,507 | B1 | 12/2002 | Weber | |
| 6,558,026 | B2 | 5/2003 | Strazzanti | |
| 6,595,672 | B2 | 7/2003 | Yamaguchi | |
| 6,634,771 | B2 | 10/2003 | Cao | |
| 6,644,842 | B2 * | 11/2003 | Yamaguchi | 362/547 |
| 6,648,495 | B1 | 11/2003 | Hsu | |
| 6,676,283 | B2 | 1/2004 | Ozawa et al. | |
| 6,682,211 | B2 | 1/2004 | English et al. | |
| 6,773,154 | B2 | 8/2004 | Desai | |
| 6,860,620 | B2 | 3/2005 | Kuan et al. | |
| 6,864,513 | B2 | 3/2005 | Lin et al. | |
| 6,910,794 | B2 | 6/2005 | Rice | |
| 7,144,145 | B2 * | 12/2006 | Watanabe et al. | 362/544 |
| 2002/0141188 | A1 | 10/2002 | Basey | |
| 2002/0154514 | A1 | 10/2002 | Yagi et al. | |
| 2002/0167818 | A1 | 11/2002 | Yoneima | |
| 2003/0002179 | A1 | 1/2003 | Roberts et al. | |
| 2003/0218885 | A1 | 11/2003 | Ishizaki | |
| 2004/0012975 | A1 | 1/2004 | Chase et al. | |
| 2004/0085768 | A1 | 5/2004 | Kai et al. | |
| 2004/0120156 | A1 | 6/2004 | Ryan | |
| 2004/0145909 | A1 | 7/2004 | Ognian et al. | |
| 2004/0149054 | A1 | 8/2004 | Soga et al. | |
| 2004/0202007 | A1 | 10/2004 | Yagi et al. | |
| 2004/0213016 | A1 | 10/2004 | Rice | |
| 2005/0024864 | A1 | 2/2005 | Galli | |
| 2005/0094414 | A1 | 5/2005 | Ishida et al. | |

FOREIGN PATENT DOCUMENTS

| | | |
|---|---|---|
| FR | 2 698 055 A | 5/1994 |
| JP | 5 235224 | 9/1993 |

OTHER PUBLICATIONS

English Abstract of French Publication No. FR 2 701 756.
English Abstract of Japanese Publication No. JP 5 235224.

* cited by examiner

HEADLAMP ASSEMBLY WITH INTEGRATED HOUSING AND HEAT SINK

BACKGROUND

1. Field of the Invention

The invention relates generally to a headlamp assembly for a motor vehicle. More specifically, the invention relates to the cooling of a headlamp assembly by conducting heat from the light source to the exterior of the headlamp assembly via conductive heat sinks.

2. Related Technology

Headlamp assemblies have a light source, such as an incandescent lamp, a light emitting diode (LED) or high intensity discharge (HID) lamp, positioned within a headlamp chamber and electrically connected to a power source. The headlamp chamber is typically defined by a transparent or translucent lens, located forward of the light source, and a reflector located rearward and/or surrounding the light source. As used herein, the terms forward and rearward are referenced with respect to the position of the light source and the direction in which the light from the source is intended to be seen. Thus, light from the assembly is intended to be seen from a forward position.

During an operation cycle of the headlamp assembly, the light sources and other components of the lamp generate heat while “on” and cool while “off”, causing the chamber to undergoes temperature fluctuation and causing the air located within to expand and contract. To maintain a relative-constant chamber pressure, the chamber typically includes at least one opening that permits an air exchange between the chamber and the ambient air. However, to prevent contaminants, such as dust and debris, from entering the chamber, the opening is typically relatively small and is covered with an air-permeable membrane.

In order to attain designed optimal performance of newer light sources, LED’S and their electrical components in the lamp assembly, it is desirable to maintain the internal temperature of the lamp assembly below the maximum operating temperature Therefore, it is advantageous to provide the headlamp assembly with a mechanism that cools the chamber and the LED’S located therein.

Headlamp assemblies are typically secured to a portion of the vehicle frame that is adjacent to the engine compartment. The temperature within the engine compartment is often significantly higher than the temperature outside of the engine compartment (the ambient temperature). For example, during operation of the vehicle various components, such as the engine and the engine cooling system, output heated air into the engine compartment. As another example, during periods of vehicle use and non-use, the air trapped within the engine compartment may become heated by solar energy. Therefore, it is advantageous to provide the headlamp assembly with a mechanism that isolates the chamber and the light sources located therein from the relatively high temperatures of the engine compartment.

In view of the above, it is beneficial to have a headlamp assembly that has a mechanism that effectively cools the mechanism’s internal components while minimizing air exchange between the headlamp assembly chamber and the atmosphere and while isolating the chamber from the engine compartment and the relatively high temperatures associated therewith.

SUMMARY

In overcoming the above limitations and other drawbacks, a headlamp assembly for a motor vehicle is provided that includes a lens and a housing that define an inner chamber that is generally fluidly isolated from the atmosphere. The housing includes portions that extend from an interior surface of the housing into the inner chamber to define a base having a light source mounted thereon. The housing further includes portions that extend from an exterior surface of the housing to define a plurality of fins exposed to ambient air. A reflector is positioned behind the light source and is adapted to reflect light from the light source forward.

In one aspect, the headlamp assembly includes a flow channel positioned adjacent the exterior surface of the housing. The flow channel is adapted to direct ambient air flowing therethrough. The fins extend into the flow channel such that heat from within the inner chamber is conducted through the base portion of the housing to the fins of the housing to the air flowing through the flow channel.

In another aspect, air flow through the flow channel can be achieved by natural convention, forced convection, induced forced convection, or any combination thereof.

In yet another aspect, the flow channel is positioned behind the headlamp assembly and is at least partially defined by the exterior surface of the housing.

In still another aspect, the flow channel includes an inlet and an outlet. The inlet of the flow channel includes venturi openings and the outlet of the flow channel is positioned in a low pressure region within the motor vehicle. Air air is drawn in through the venturi openings at the inlet and flows toward the low pressure region at the outlet. The venturi openings at the inlet of the flow channel include one way valves.

In still another aspect, the housing is made from a conductive material selected from the group: metal, metal alloy, silicon, and graphite.

Further objects, features and advantages of this invention will become readily apparent to persons skilled in the art after a review of the following description, with reference to the drawings and claims that are appended to and form a part of this specification.

DETAILED DESCRIPTION

Figure 1:
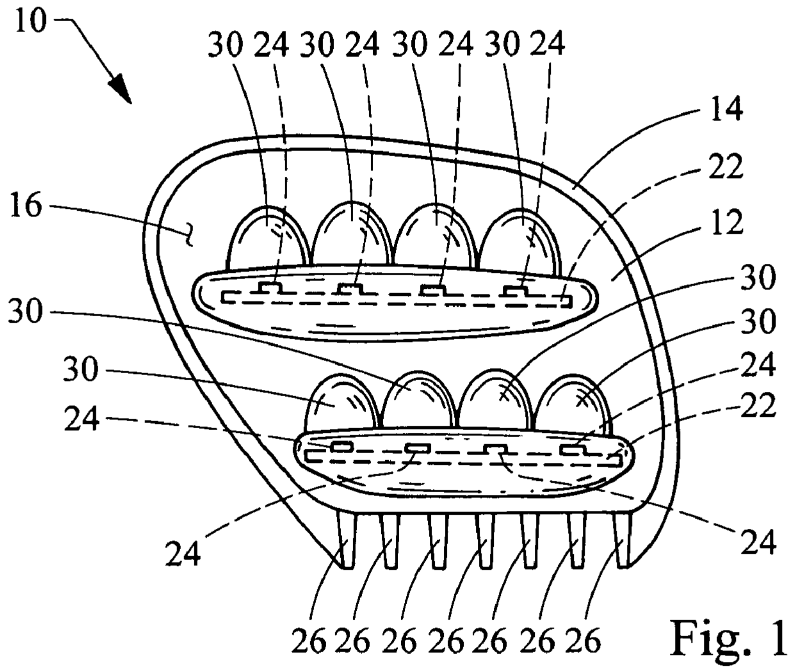
FIG. 1 is a front schematic view of a headlamp assembly for a motor vehicle embodying the principles of the present invention.
Figure 2:
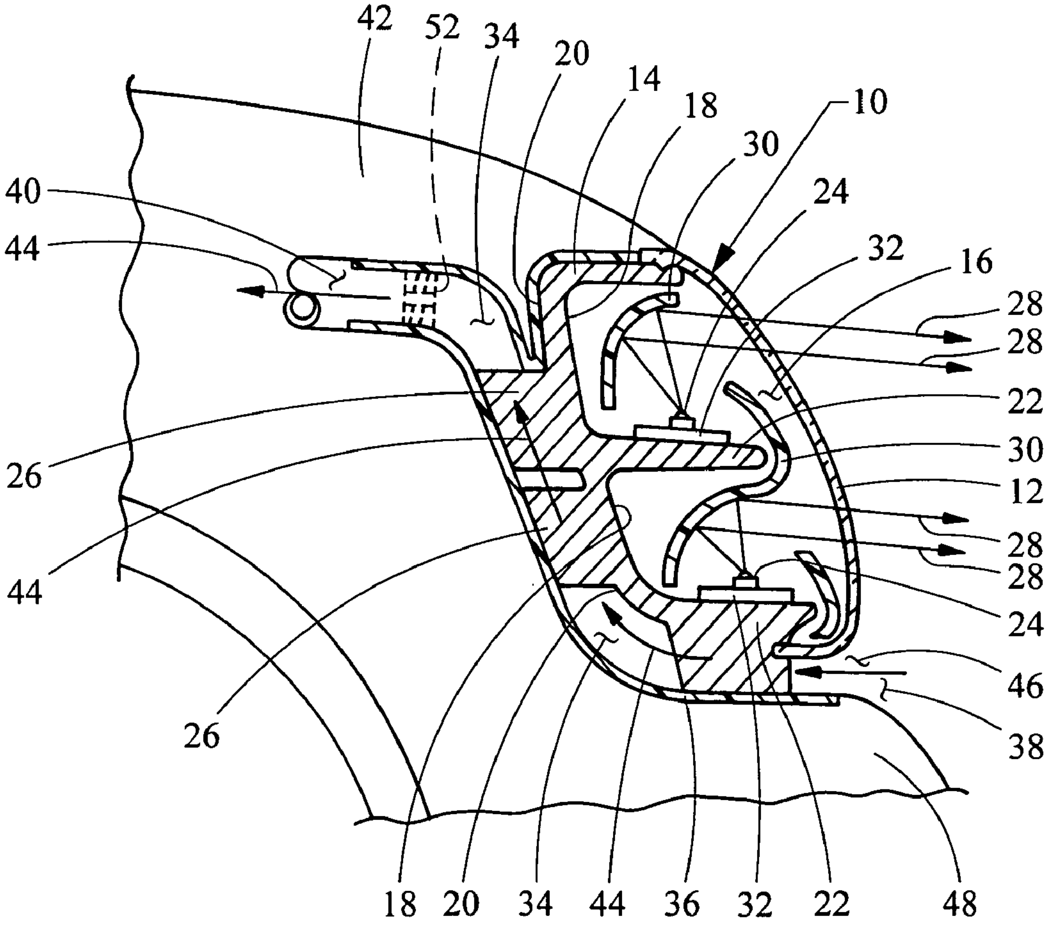
FIG. 2 is a sectional view taken generally along line 2-2 of the headlamp assembly shown in FIG. 1.

Referring to FIGS. 1 and 2, a headlamp assembly for a motor vehicle in accordance with the teachings of the claims herein is shown generally at 10. The headlamp assembly 10 includes a lens 12 and a housing 14 that cooperate to at least partially define an inner chamber 16 that is generally fluidly isolated from the atmosphere. The housing 14 is preferably opaque, and the lens 12 is preferably formed from a transparent or translucent plastic material, such as polycarbonate.

Figure 3:
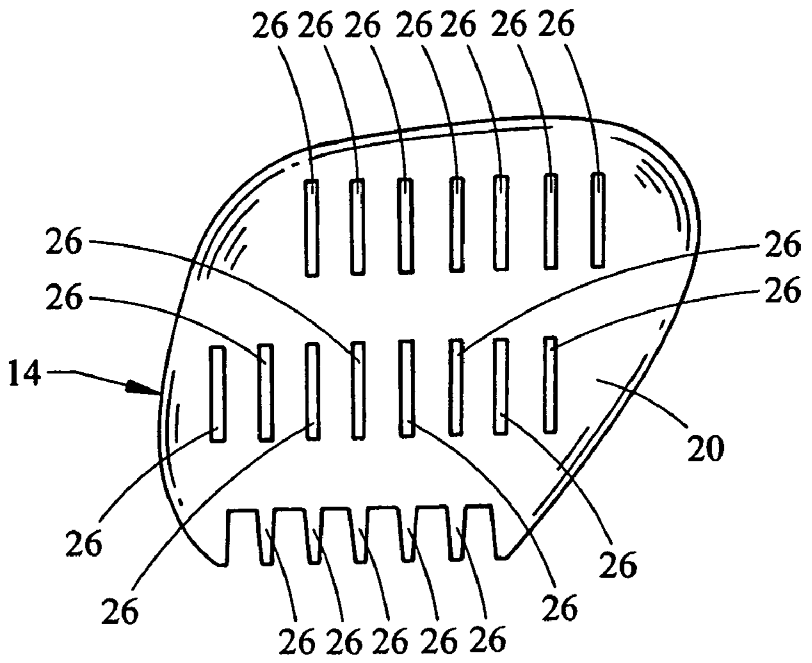
FIG. 3 is a rear view of the housing of the headlamp assembly shown in FIG. 1.

The housing 14 includes an interior surface 18 and an exterior surface 20. Portions of the housing 14 extend from the interior surface 18 into the inner chamber 16 to define a base 22 that operates as a support and mount for a light source 24. Portions of the housing 14 also extend from the exterior surface 20 to define a plurality of fins 26 that are exposed to ambient air outside of the chamber 16, as shown in FIGS. 1, 2, and 3, and further described below.

As shown in FIGS. 1 and 2, the housing 14 includes portions that define two bases 22, one positioned immediately above the other. Each base 22 includes a plurality, four as shown, of light sources 24 mounted thereon.

The headlamp assembly 10 further includes surfaces that cooperate to focus light rays 28 from the light sources 24 into a beam having desired characteristics and direct the light rays 28 towards the lens 12. As shown, a plurality of reflectors 30 are positioned within the inner chamber 16, one reflector 30 being positioned relative to each light source 24, to achieve this. The reflectors 30 re-direct the light rays 28 received thereby in a forward direction and through the lens 12.

The housing 14 and the lens 12 are connected with one another such that the inner chamber 16 is substantially sealed from the atmosphere. The inner chamber 16 is, however, provided with pressure vents (not shown) that permit a relatively small amount of airflow into and out of the inner chamber 16 to account for air pressure fluctuations during temperature changes therein.

The light sources 24, are preferably light emitting diodes (LEDs). Each light source 24, hereinafter just "LED 24", is attached to a printed circuit board (PCB) 32 that includes electronic controls and connections for the LED 24. Furthermore, each LED 24 and PCB 32 are supported on the base portion 22 of the interior surface 18 of the housing 14 in a well known manner. Preferably, the housing 14 is constructed of a material having a relatively high thermal conductivity, such as metals, metal alloys, silicon, and graphite.

During operation of the headlamp assembly 10, each LED 24 generates heat and increases the temperature of the air, components and structures located within the inner chamber 16. However, the LED 24 and/or other electronic components may experience diminished performance or failure if their maximum operating temperature is exceeded. To reduce the temperature of these components, the LEDs 24 and PCBs 32 are mounted onto the base portion 22 of the interior surface 18 of the housing 14 such that heat from the light sources 24 will be conducted through the base 22 to the fins 26 extending from the exterior surface 20 of the housing 14, and thus outside of the inner chamber 16. Ambient air flowing across the fins 26 will cool the fins 26, thereby dissipating the heat conducted from within the inner chamber 16.

To insure that ambient air is directed over and around the fins 26, the headlight assembly 10 may include a flow channel 34 positioned adjacent the housing 14. As shown in FIG. 2, a flow channel wall 36 is positioned adjacent to and spaced from the exterior surface 20 of the housing 14, thereby defining the flow channel 34. The flow channel wall 36 and the exterior surface 20 of the housing 14 are preferably spaced apart from each other along their respective lengths so that the flow channel 34 has a substantially constant width, thereby minimizing flow loss across the flow channel 34.

The flow channel 34 is adapted to direct ambient air flowing therethrough, wherein the fins 26 extend into the flow channel 34 such that heat from within the inner chamber 16 is conducted through the base 22, to the fins 26, and to the air flowing through the flow channel 34.

Referring to FIG. 2, the flow channel 34 includes an inlet 38 and an outlet 40. The inlet 38 of the flow channel 34 is oriented in the forward direction and is positioned near the front bottom of the headlamp assembly 10. The outlet 40 of the flow channel 34 is oriented in the rearward direction and is positioned near the rear top of the headlamp assembly 10. With the headlamp assembly 10 placed near the front of the motor vehicle 42, when the motor vehicle 42 is moving in a forward direction, a stream of fresh ambient air flows into the inlet 38 of the headlamp assembly 10 and into the flow channel 34, as indicated by arrows 44. In this way, cooling of the fins 26 is achieved by "forced" convection. An air duct or opening 46 defined by the front portion of the motor vehicle 42, such as a bumper 48, may be positioned near the inlet 38 to further promote the inflow of ambient air.

Figure 4:
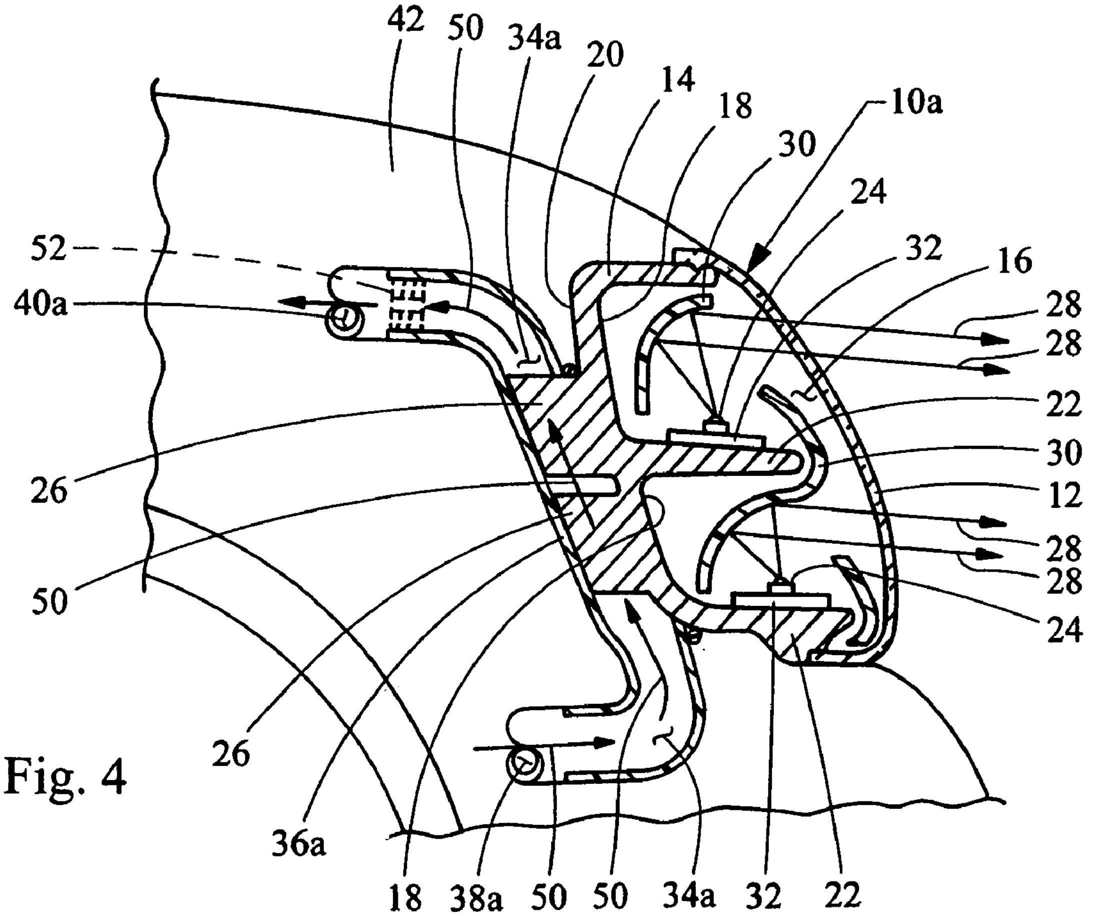
FIG. 4 is a sectional view of an alternative embodiment, having forced air moving through the flow channel.

Referring to FIG. 4, an alternative embodiment of the headlamp assembly is shown generally at **10*a*. A flow channel 34*a* for the headlamp assembly 10*a* includes an inlet 34*a* that is located near the bottom of the headlamp assembly 10*a*, but is not exposed openly to the front of the vehicle 42. The flow channel 34*a* has an outlet 40*a* that is again positione assembly 10*a*. In this instance, as the fins 26 heat up, the air within the flow channel 34*a* will also heat up, by convection. The heated air will rise upward, causing a draft that will pull cooler air up from the inlet 38*a*, as cooler air comes upward into contact with the fins 26, it will in turn be heated and rise upward, thereby creating a flow of air through the flow channel 34*a* by natural convention, as indicated by arrows 50**.

In either instance, the headlamp assembly 10 shown in FIG. 2 or the headlamp assembly **10*a* shown in FIG. 4 could include a fan 52 (shown in phantom) mounted near the inlet 38, 38*a* or the outlet 40, 40*a* to force air to flow through the flow channels 34, 34*a*. An electric fan 52 would provide selective induced forced convection to draw ambient air in through the inlets 38, 38*a* and push air through the flow channels 34, 34*a* to the outlets 40, 40*a***.

Figure 5:
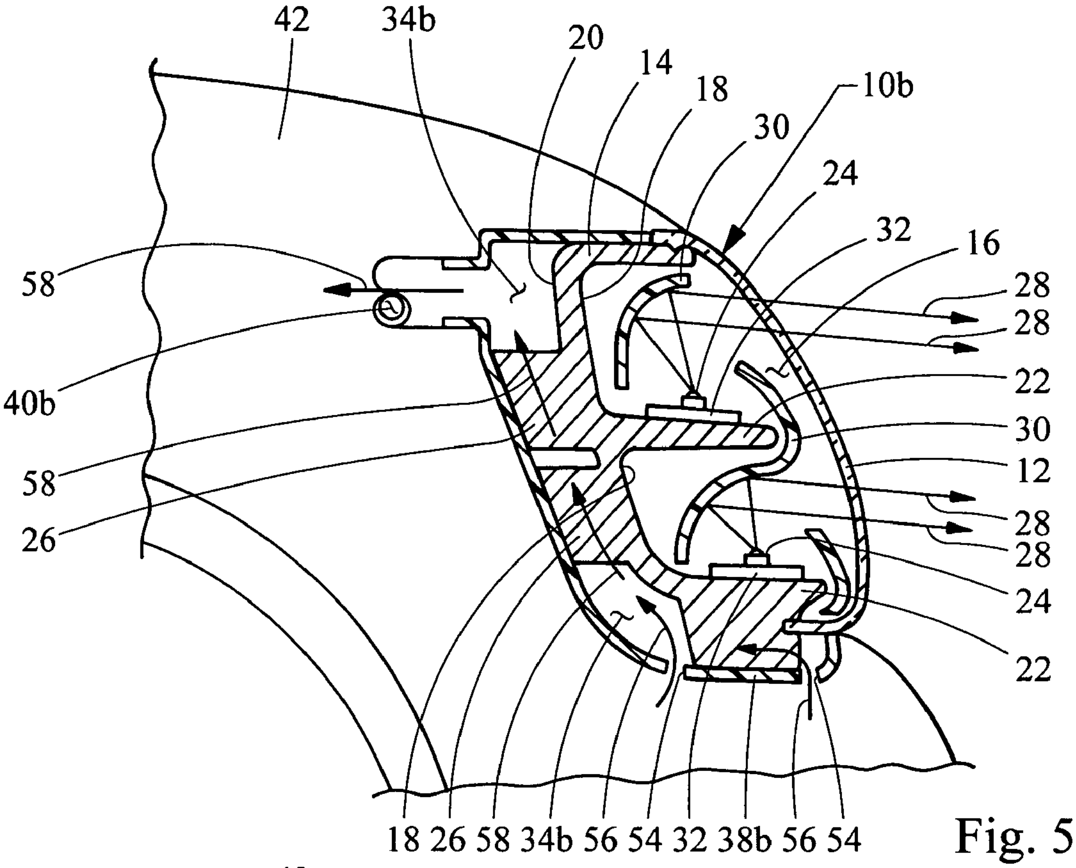
FIG. 5 is a sectional view of an alternative embodiment, having venturi openings positioned at the inlet of the flow channel, the outlet of the flow channel being positioned at a low pressure region.

Referring to FIG. 5, another embodiment of the headlamp assembly is shown generally at **10*b*. A flow channel 34*b* for the headlamp assembly 10*b* includes an inlet 38*b* that is located near the bottom of the headlamp assembly 10*b*, but is not exposed openly to the front of the vehicle 42. The inlet 38*b* comprises a plurality of venturi openings 54 formed within the flow channel wall 36*b*. The flow channel 34*b* has an outlet 40*b* that is again positioned near the rear top of the headlamp assembly 10*b*. In this instance, the outlet 40*b* is strategically positioned within an area that is a low pressure region when the vehicle 42** is moving forward.

When the vehicle 42 is moving, air will naturally flow from higher pressure to the low pressure region at the outlet **40*b* of the flow channel 34*b*. The low pressure region will draw air in through the venturi openings 54 in the flow channel wall 36*b*, as indicated by arrows 56, and through the flow channel 34*b*, thereby developing a flow of air from the region near the inlet 38*b*, which is relatively higher pressure than the low pressure region near the outlet 40*b*. Heat from within the inner chamber 16 is conducted through the base 22, to the fins 26, and to the air flowing through the flow channel 34*b*, as indicated by arrows 58, to cool the inner chamber 16 and the housing 14. One way valves (not shown) could be placed at the venturi openings 54 to insure that the flow of air is restricted to only flowing into the flow channel 34*b* through the venturi openings 54**.

Figure 6:
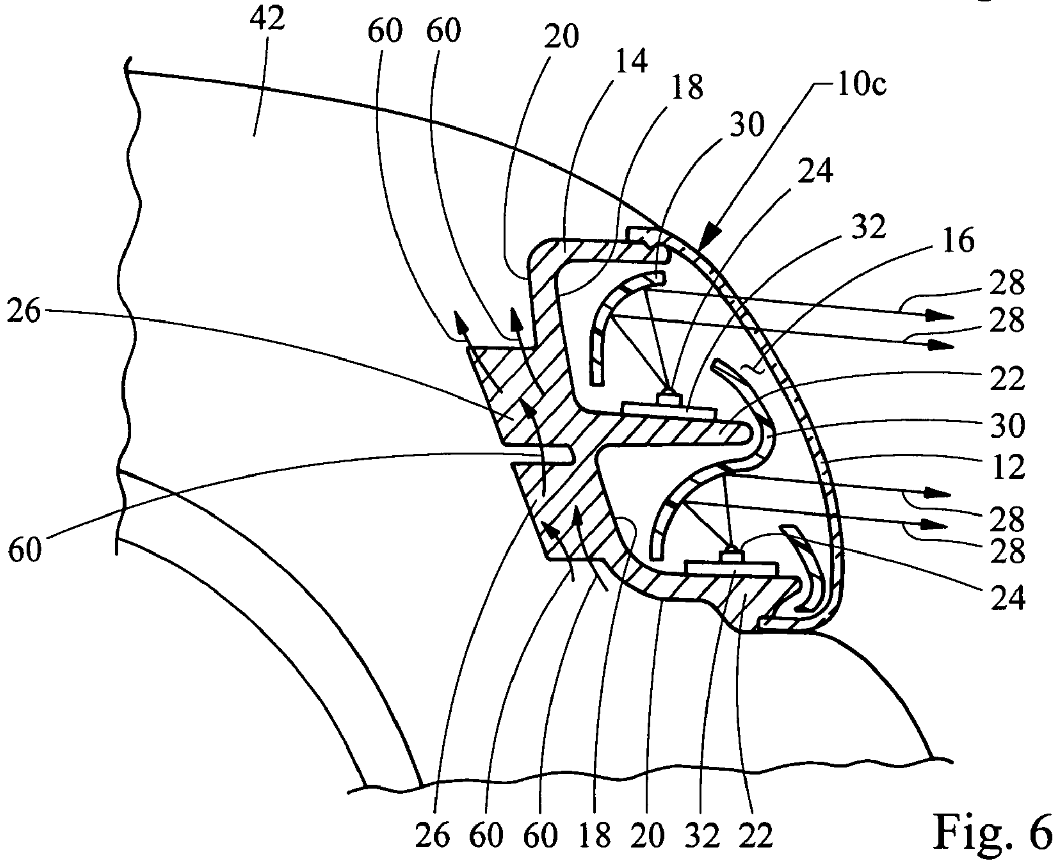
FIG. 6 is a sectional view of an alternative embodiment that does not include a flow channel.

Referring to FIG. 6, still another embodiment of the headlamp assembly is shown generally at **10*c*. The headlamp assembly 10*c* does not have a flow channel wall or a flow channel. Cooling of the fins 26 comes only from natural convection as discussed previously. As heat is conducted to the fins 26 from the inner chamber 16, the fins 26 heat up. The air near and around the fins 26 is heated by the fins 26 and begins to rise upward. The heated air will rise upward, causing a draft that will pull cooler air up and into the spaces between and around the fins 26. As cooler air comes into contact with the fins 26, it will in turn be heated and rise upward, thereby creating a flow of air through and around the fins 26 by natural convention, as indicated by arrows 60**.

By making the housing 14 from a thermally conductive material and using portions of the interior surface 18 to define the base 22 and portions of the exterior surface 20 to define the fins 26, the housing 14 acts both as the housing 14 and as an additional heat sink to conduct heat away from the inner chamber 16. The housing 14 can be made from any suitable thermally conductive materials such as metal, metal alloy, silicon, or graphite material, and more specifically, aluminum. Alternatively, the housing 14 may include a plurality of conductive components, such as a metal, a metal alloy, or a graphite material, embedded within a base material, such as a polymer. In this design, the benefits discussed above are equally applicable.

It is therefore intended that the foregoing detailed description be regarded as illustrative rather than limiting, and that it be understood that it is the following claims, including all equivalents, that are intended to define the scope of this invention.

What is claimed is:

1. A headlamp assembly for a motor vehicle comprising:

a lens;

a housing, the housing and the lens defining an outer wall having interior surfaces cooperating to at least partially define an inner chamber that is generally fluidly isolated from the atmosphere;

portions of the housing extending from the interior surface into the inner chamber to define a base, a light source being mounted onto the base;

the outer wall of the housing having an exterior surface and including portions extending therefrom to define a plurality of fins exposed to ambient air;

an enclosed flow channel defined in part by the exterior surface of the outer wall of the housing, the flow channel having an inlet and an outlet, wherein the fins extend into the flow channel such that heat from within the inner chamber is conducted through the base portion of the housing to the fins of the housing to air within the flow channel; and a reflector positioned within the inner chamber of the housing and adapted to reflect light from the light source through the lens.

2. A headlamp assembly as in claim 1, wherein the inlet of the flow channel is oriented in the forward direction, whereby forward motion of the vehicle will cause air to be forced into the flow channel.

3. A headlamp assembly as in claim 2, wherein the inlet is located adjacent to a bottom portion of the headlamp assembly and the outlet is located adjacent to a top portion of the headlamp assembly.

4. A headlamp assembly as in claim 2, further including a fan mounted within the flow channel, the fan being adapted to draw air into and push air through the flow channel.

5. A headlamp assembly as in claim 1, wherein the flow channel is positioned behind the headlamp assembly, the flow channel being at least partially defined by the exterior surface of the housing.

6. A headlamp assembly as in claim 1, wherein a plurality of light sources are mounted onto the base portion of the housing.

7. A headlamp assembly as in claim 1, wherein the housing is made from a conductive material.

8. A headlamp assembly as in claim 1, wherein the housing is made from a material selected from the group: metal, metal alloy, silicon, and graphite.

9. A headlamp assembly as in claim 1, wherein the light source is a light emitting diode.

10. A headlamp assembly as in claim 1, wherein the inlet of the flow channel includes venturi openings and the outlet of the flow channel is positioned in a low pressure region within the motor vehicle such that air will be drawn in through the venturi openings at the inlet and flow toward the low pressure region at the outlet.

11. A headlamp assembly as in claim 10, wherein the venturi openings at the inlet of the flow channel include one way valves.

12. A headlamp assembly for a motor vehicle comprising:

a lens;

a housing defining an exterior wall, the exterior wall and the lens cooperating to at least partially define an inner chamber that is generally fluidly isolated from the atmosphere, the housing being made from a thermally conductive material selected from the group: metal, metal alloy, silicon, and graphite;

unitary portions of the housing extending from an interior surface of the exterior wall into the inner chamber to define at least one base, at least one light source being mounted onto each base;

an enclosed flow channel positioned adjacent an exterior surface of the exterior wall, at least a portion of the flow channel being defined by the exterior surface of the exterior wall, the flow channel being adapted to direct ambient air flowing therethrough;

unitary portions of the housing extending from the exterior wall of the housing to define a plurality of fins extending into the flow channel such that heat from within the inner chamber is conducted through the base and exterior wall of the housing to the fins and to the air flowing through the flow channel;

a reflector positioned behind the light source within the inner chamber and adapted to reflect light from the light source through the lens.

13. A headlamp assembly as in claim 12, wherein the flow channel includes an inlet and an outlet, the inlet of the flow channel being oriented in the forward direction, whereby forward motion of the vehicle will cause air to be forced into the flow channel such that the air flow within the flow channel is achieved by forced convection.

14. A headlamp assembly as in claim 13, wherein the inlet is located adjacent to a bottom portion of the headlamp assembly and the outlet is located adjacent to a top portion of the headlamp assembly.

15. A headlamp assembly as in claim 14, further including a fan mounted within the flow channel near the inlet, the fan being adapted to draw air into and push air through the flow channel, wherein the air flow within the flow channel is achieved by induced forced convection.

16. A headlamp assembly as in claim 12 wherein the light sources are light emitting diodes.

17. A headlamp assembly as in claim 12, wherein the flow channel includes an inlet and an outlet, the inlet of the flow channel including venturi openings and the outlet of the flow channel being positioned in a low pressure region within the motor vehicle such that air will be drawn in through the venturi openings at the inlet and flow toward the low pressure region at the outlet.

18. A headlamp assembly as in claim 17, wherein the venturi openings at the inlet of the flow channel include one way valves.

* * * * *